United States Patent [19]

Campagnolo et al.

[11] Patent Number: 4,788,040
[45] Date of Patent: Nov. 29, 1988

[54] INLET DISTRIBUTOR FOR FIXED BED CATALYTIC REACTOR

[75] Inventors: Joseph F. Campagnolo, Oradell; Tai-Sheng Chou, Sewell; William F. Heaney, Hamilton Township, Mercer County, all of N.J.; John D. Ruggles, Surrey, England

[73] Assignee: Mobil Oil Corporation, New York, N.Y.

[21] Appl. No.: 883,848

[22] Filed: Jul. 10, 1986

Related U.S. Application Data

[63] Continuation of Ser. No. 576,816, Feb. 3, 1984, abandoned.

[51] Int. Cl.$^4$ .................. B01D 47/00; B01J 8/04
[52] U.S. Cl. .................. 422/220; 422/191; 422/195; 261/114.1; 261/114.5; 208/146; 55/30
[58] Field of Search .................. 422/220, 191, 195; 261/97, 114.1, 114.5; 55/30; 208/146

[56] References Cited

U.S. PATENT DOCUMENTS

| | | | |
|---|---|---|---|
| 973,795 | 10/1910 | Lummus | 261/114.1 |
| 1,141,266 | 6/1915 | Raschig | 422/220 |
| 2,924,441 | 2/1960 | Osborne . | |
| 3,146,189 | 8/1964 | Kunreuther et al. | 422/220 |
| 3,353,924 | 11/1967 | Riopelle . | |
| 3,524,731 | 8/1970 | Effron et al. . | |
| 3,642,452 | 2/1972 | Roget et al. | 201/114.1 |
| 3,824,081 | 7/1974 | Smith et al. | 422/220 |
| 4,126,539 | 11/1978 | Derr et al. . | |
| 4,126,540 | 11/1978 | Grosboll et al. . | |
| 4,305,895 | 12/1981 | Heath et al. | 261/114.1 |
| 4,385,033 | 5/1983 | Gupta | 422/220 |

*Primary Examiner*—Barry S. Richman
*Assistant Examiner*—Lynn M. Kummert
*Attorney, Agent, or Firm*—Alexander J. McKillop; Michael G. Gilman; Dennis P. Santini

[57] ABSTRACT

An inlet distributor system for a fixed bed catalyst reactor which includes an inlet deflector cone positioned to deflect liquid in cooperation with a splash plate onto a liquid distributor trough positioned therebelow. An upper tray is positioned beneath the distributor trough to receive liquid therefrom. The upper distributor tray has a series of risers in spaced position thereon and extending above and below the upper distributor tray. The risers are hollow and open above and below the upper distributor tray to permit vapor to pass through the tray and each riser has a plurality of weir slots cut into its outer surface through which liquid can pass through the tray. A lower distributor tray is positioned beneath the upper distributor tray to receive liquid passing through the weir slots of the risers. The lower distributor tray has a series of risers and downpipes thereon arranged in a predetermined pattern. Each of the risers and downpipes in said pattern extend above and below the lower distributor tray and have openings above and below the lower distributor tray to form a through passageway for liquid to pass through the tray when received from the upper distributor tray. The passageway in the downpipes is formed by an axial bore therethrough and the passageway in the risers is formed by its hollow tubular configuration open at the bottom and having a side opening therein above the upper surface of the lower distributor tray each riser includes another upper opening above the lower distributor tray to permit vapor to pass through the tray. The pattern of risers and downpipes provide an advantageous arrangement of passageways for liquid to be distributed to the catalytic bed therebelow.

11 Claims, 3 Drawing Sheets

INLET DISTRIBUTOR FOR FIXED BED CATALYTIC REACTOR

This is a continuation of copending application Ser. No. 576,816, filed on Feb. 3, 1984 now abandoned.

BACKGROUND OF THE INVENTION

One area of considerable concern in dealing with fixed bed catalytic reactors concerns the manner in which the liquid introduced to the reactors is distributed with respect to the fixed bed contained therein. There are a number of different types of distributors presently in use for facilitating the uniform application of liquid over the upper face of a catalyst bed.

One common type of system such as described in U.S. Pat. No. 4,126,539 involves an inlet deflector cone cooperating with a splash plate and liquid distributor trough to pass liquid into the reactor to two distributor trays which are designed to facilitate the uniform spreading of liquid over the upper face of a catalyst bed. The distributor trays contain a series of spaced risers which have dual functions. They permit vapor to pass the tray and also serve as liquid conduits due to weir slots cut into the sides of the risers.

There are several difficulties encountered in this basic design. The liquid is carried past the tray by the risers and thus, the number of points at which the liquid is introduced to the upper face of the bed is limited by the number of risers which can be uniformly positioned on the tray. This limitation is aggravated by the fact that the risers are of relatively large diameter and it is necessary to fabricate the tray in sections. Accordingly, as the number of liquid introduction points is decreased, the depth to which the liquid must penetrate the catalyst bed to reach equilibrium distribution increases, and catalyst utilization in the upper bed is thereby impaired. Additionally, due to the nature of liquid flow through weirs, the uniformity of liquid distribution effected by this type of design is very sensitive to tray unevenness introduced during fabrication or installation.

Another example of a known distributor is the mixed-phase flow distributor for packed beds of U.S. Pat. No. 3,524,731. That distributor was designed primarily to accommodate wide variations in liquid feed rate. Liquid flow is normally through liquid downpipes. At very high liquid rates some liquid overflows into the vapor chimneys through triangular weirs. However, during normal operation the chimneys do not carry liquid and hence do not contribute to the number of liquid streams entering the bed. Also, during periods when they carry liquid there would be a great variation in the liquid flow through the chimneys compared with that through the tubes.

U.S. Pat. No. 3,353,924 shows a somewhat different approach, however, flow into the liquid tubes is still through a pair of notched weirs and the disadvantages mentioned above are applicable with respect to this system as well. There is no liquid flow in the vapor chimneys, and the number of uniformly spaced liquid streams which can be placed on the tray is therefore limited.

Attention is again directed to U.S. Pat. No. 4,126,539 which is the system initially discussed above. Liquid flow is through the vapor downcomers only, by a combination of hole and weir flow. There is no attempt or suggestion in the system of the patent to utilize the tray area between the downcomers for liquid distribution, and the use of weir flow makes the distribution pattern vulnerable to variations in tray level.

Other approaches appear in U.S. Pat. Nos. 4,126,540 and 4,140,625 where liquid flow is through holes in downcomers only. There is no attempt to make use of the tray area between downcomers and the size of the downcomers coupled with the need to maintain tray mechanical integrity prevents maximization of the number of liquid streams entering the catalyst bed.

Liquid distribution is also of concern in other environments. For example in U.S. Pat. No. 2,924,441 the disclosure is related to the design of a liquid distributor for gas/liquid contact such as in gas absorption or distillation in a packed tower. Emphasis is on mechanical construction of such a nature as to permit application of a corrosion resistant coating such as glass or Teflon. The distributor described makes no attempt to address the special need for good initial liquid distribution found in cocurrent downflow catalytic reactors and therefore would not lead one to the realm of the present invention.

Another patent of interest in the general state of the art is U.S. Pat. No. 2,772,780 which, although concerned with good liquid distribution, deals with the contact of upward flowing liquid with downward flowing solids. Since there are no vapor chimneys occupying part of the tray area, uniform layout of liquid streams is not a problem. Thus, the teaching would not lead one to a concept such as that of the present invention.

SUMMARY OF THE INVENTION

With the above background in mind, it is among the primary objectives of the present invention to provide an improved distributor design which eliminates the above discussed areas of concern. This is accomplished in several significant ways.

First, the number of discrete liquid streams entering the upper face of the catalyst bed is maximized in a manner which is consistent with a design incorporating ease of fabrication and mechanical integrity. Maximizing the liquid streams both helps ensure good distribution within the bed and reduces the bed penetration required to obtain equilibrium liquid distribution, resulting in good catalyst utilization in the upper bed. It is submitted that it is advantageous to provide a minimum of four equally spaced streams per square foot of bed cross section to achieve the latter.

Second, the distributor is designed to ensure as nearly as possible that the liquid flow rate of each stream is the same, hence resulting in uniform liquid irrigation over the entire face of the bed. In order for this to occur throughout the range of liquid charge rates to the reactor, the nature of the fluid flow through the apertures in the distributor plate should be similar. Hence, in the design of the present invention, liquid flow is through orifices in the riser and through the liquid downpipes. In both cases flow is proportional to the square root of the liquid height on the distributor tray. If a mix of orifices and slotted weirs (flow proportional to liquid height raised to 1.5 power) were used, it would be nearly impossible to have the same flow rate for each liquid stream of liquid feed to the reactor. The possibility of having the same flow rate occurs only at a single rate of liquid feed to the reactor.

Third, the distributor is designed in a manner which minimizes the effect of uneven tray fabrication and installation. This overcomes the difficulty that, if the distributor tray were out of level, there would be more liquid head on the low side of the tray. Since the flow rate through the apertures of the distributor of the present invention is proportional to the square root of liquid height, the effect of such distortions on local liquid distribution is minimized. By contrast, in a distributor employing weir flow, the effect of tray irregularities is magnified.

Thus, the above objectives alleviate the difficulties discussed in connection with the background in a number of ways as discussed. More specifically, it is an objective to provide an improved distributor design of the general type described above which consists of an inlet deflector cone, splash plate and liquid distributor trough followed by two distributor trays which spread the liquid uniformly over the upper face of a catalyst bed. The number of liquid introduction points is increased by fitting a series of downpipes into the face of the tray, which, because they carry only liquid can be much smaller than the risers. Where, for reasons of symmetry, a downpipe would have to be placed in a position already occupied by a riser, a hole is bored into the side of the riser instead.

The downpipes are fabricated from bolts which have been axially bored to the correct diameter, and are held in place by retaining nuts on the underside of the tray. Because the bolts extend above the upper face of the tray, there is room on the tray to accumulate sediment which would foul the openings if holes were merely drilled into the tray. Furthermore, the mechanical nature of affixing the downpipes to the tray eliminates the tray warpage which would result from more conventional welding based fabrication techniques.

The total number of liquid distribution points represented by downpipes and riser holes can vary but in one successful embodiment it has been found that there should be a minimum of four per square foot. This is nearly twice as many as now utilized in prior distributors of a similar type. Because the liquid now flows through orifices rather than weirs, this design is much less sensitive to variations in tray level.

In summary, an inlet distributor for a fixed bed catalyst reactor is provided. The catalyst reactor is of the type having a hollow shell with an upper entry opening and a lower drain opening with a catalyst bed in the shell. The inlet distributor includes an inlet deflector cone positioned in the shell beneath the entry opening so as to deflect liquid introduced into the shell in cooperation with a splash plate onto a liquid distribution trough positioned therebelow. An upper distributor tray is positioned beneath the distributor trough to receive liquid from the trough. The upper distributor tray has vapor passage means to permit vapor to pass the tray and liquid passage means through which liquid received from the distributor trough can pass from above to below the upper distributor tray. The lower distributor tray is positioned beneath the upper distributor tray to receive liquid from the upper distributor tray. The lower distributor tray has a series of risers and down pipes thereon arranged in a predetermined concentrated pattern. Each of the risers and down pipes in said pattern extends through an opening in the tray and above and below the tray with openings therein to form a through passageway for liquid to pass through the tray when received from the upper distributor tray.

The concentrated pattern of risers and downpipes provides an advantageous arrangement of passageways for liquid to be distributed to the catalytic bed therebelow.

With the above objectives in mind, reference is made to the attached drawing.

DETAILED DESCRIPTION

Figure 1:
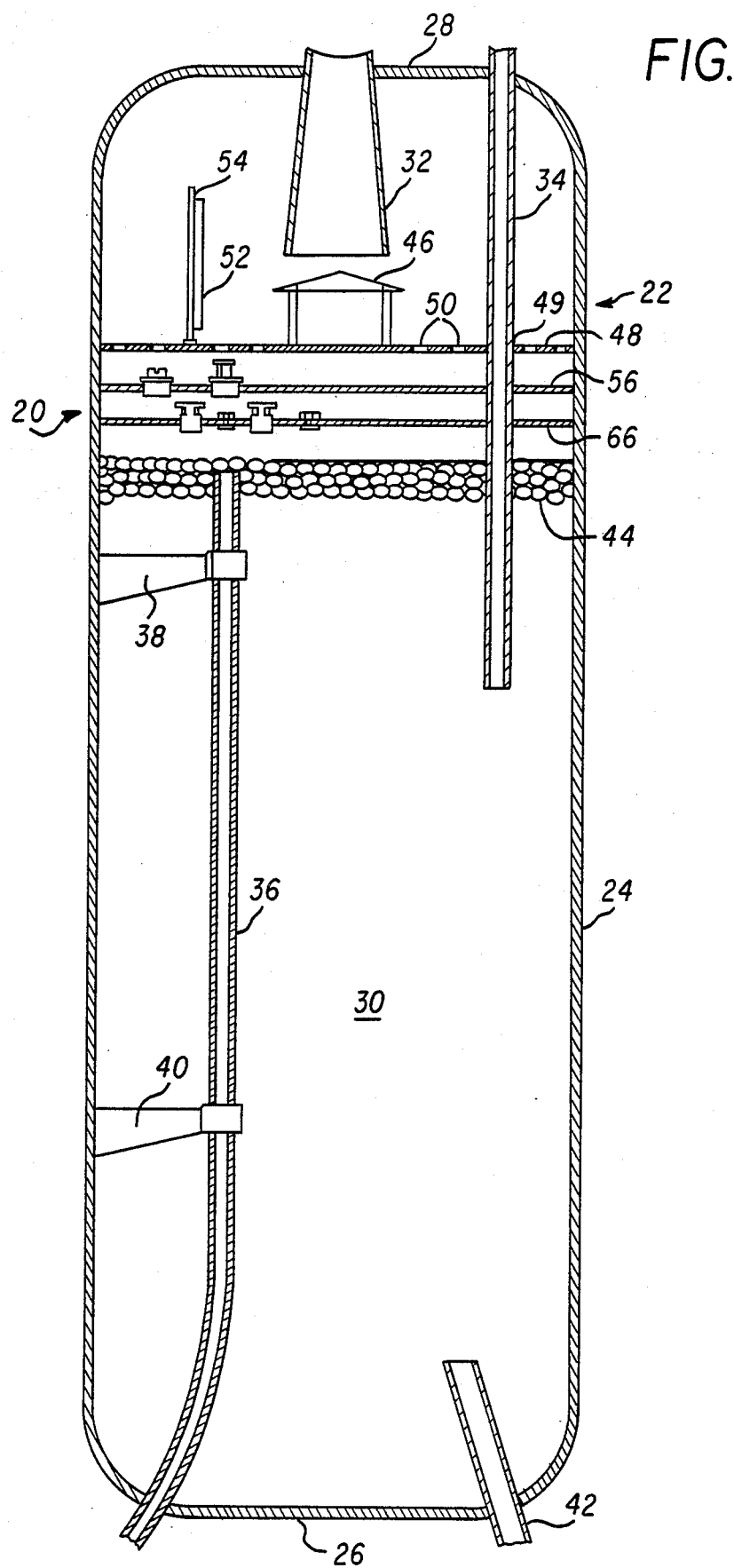
FIG. 1 is a schematic elevation view of a fixed bed catalytic reactor containing the inlet distributor of the present invention.

The inlet distributor 20 of the present invention is shown in FIG. 1 mounted within a fixed bed catalytic reactor 22. The catalytic reactor includes an outer hollow shell 24 in vertical position with a bottom end 26 and a top end 28.

Inlet distributor 20 is mounted above a hollow chamber (unnumbered but defined within the lower confines of outer hollow shell 24 and bottom end 26 of catalytic reactor 22) where the fixed catalytic bed 30 is located. An inlet conduit 32 extends through an opening in the top end 28 of the shell for introduction of liquid to the reactor. Additionally, a sampling pipe 34 extends through an opening in the upper end of shell 24 adjacent to the inlet 32. The sampling pipe 34 extends through appropriate sleeves as it is directed downward through the tray elements of inlet distributor 20 and into the catalyst bed 30 for sampling purposes.

Extending upward through an opening in the bottom end 26 of the shell is a thermowell 36 extending upward in a conventional manner through the catalyst bed for monitoring temperature. The thermowell 36 is mounted to the inner wall of shell 24 in a conventional manner such as by spaced brackets 38 and 40.

Also extending through an opening in the bottom 26 of shell 24 is a drain pipe 42 for facilitating draining of the catalyst bed 30.

The actual catalytic reaction process is accomplished in the conventional manner as exemplified by the various catalytic reaction processes shown in the above discussed prior art. One example of a process conducted in this manner is shown in U.S. Pat. No. 4,126,539.

The bed 30 is conventionally covered by a layer of inert balls 44 positioned beneath the distributor tray arrangement.

The inlet conduit 32 is positioned immediately above an inlet deflector cone 46 supported in a conventional manner on appropriate beams and supports in approximately the axial center of shell 24. The cone extends upward from a distributor trough 48 extending in a path concentric with the shell and having a plurality of spaced weirs 50 formed therein for passage of liquid therethrough.

The upper surface of the deflector cone 46 is configured for directing liquid entering through conduit 32 downward and outward and to contain this outwardly directed liquid a splash plate 52 is positioned about the circumference of the cone 46 and spaced outwardly therefrom. The splash plate 52 is mounted on a plurality of spaced upright supports 54 extending upward from the distributor trough 48.

An upper distributor tray 56 is mounted to the walls of shell 24 in a conventional manner and is positioned below the distributor trough 48. In the upper distributor tray 56 is located a plurality of sleeved apertures 58 in addition to the upper riser 60 through which liquid can pass.

Figure 3:
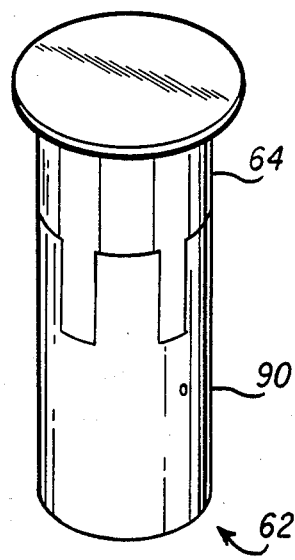
FIG. 3 is a enlarged perspective view of one of the risers employed in the embodiment of FIG. 1.
Figure 2:
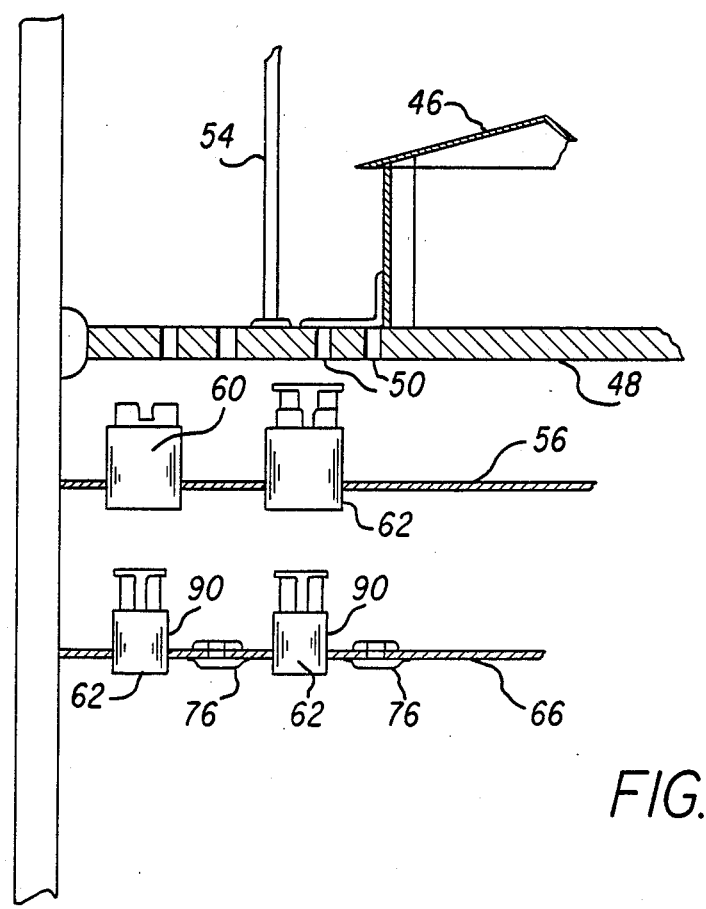
FIG. 2 is an enlarged fragmentary view of the embodiment of FIG. 1.
Figure 5:
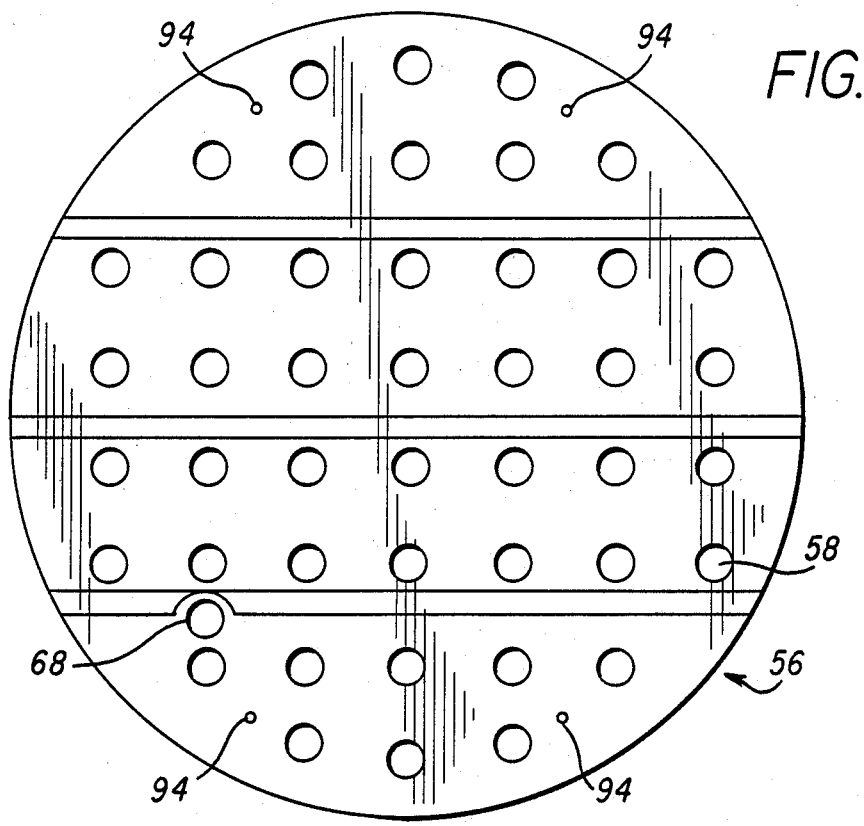
FIG. 5 is a top plan view of the upper distributor tray portion of the invention.
Figure 6:
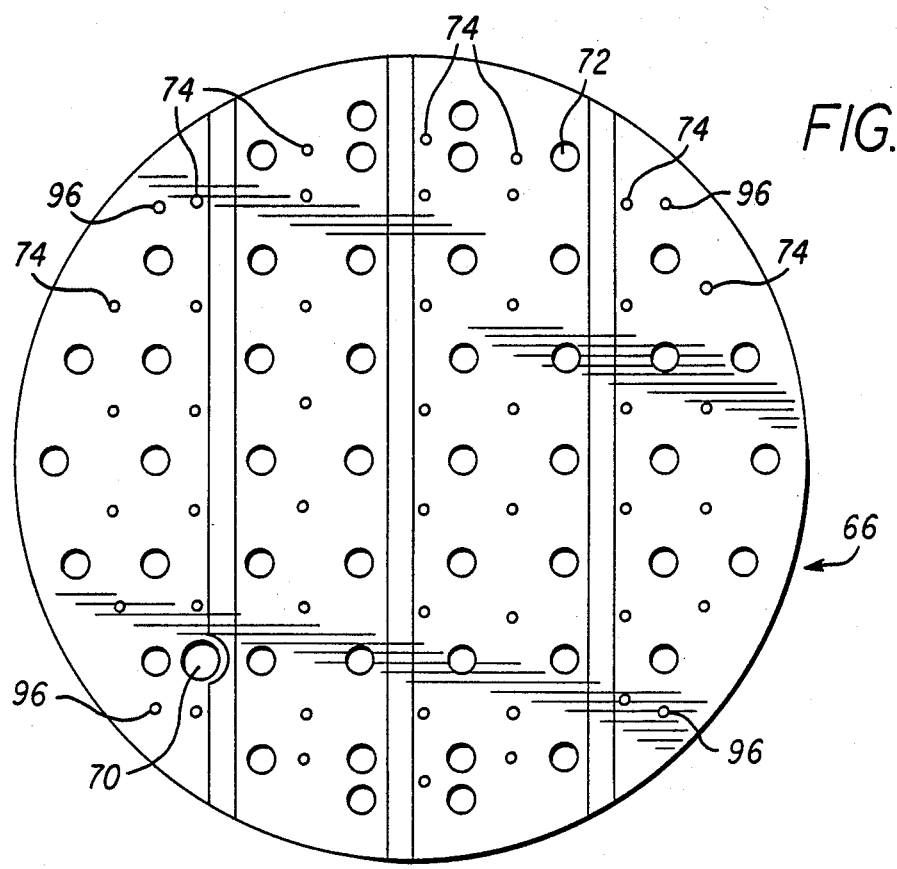
FIG. 6 is a top plan view of the lower distributor tray portion of the invention.

Upper distributor tray 56 is shown in detail in FIG. 5. The tray contains an array of apertures 58 adapted to have mounted therein capped risers 62 of the type depicted in FIG. 3 and uncapped riser 60. Actually two different types of risers are generally employed as shown in FIG. 2 where an uncapped riser 60 is shown adjacent to a capped riser 62. One of the capped risers 62 is depicted in FIG. 3. In one acceptable embodiment, there are fourteen capped risers 62 and thirty uncapped risers 60 positioned in the forty-four holes 58 shown in upper distributor tray 56. The number and distribution of the respective risers is a matter of choice. The risers 62 and 60 are hollow so that there is normally a through passageway from the open bottom end through the open top end. In the case of the capped risers, the top end is shielded. However, in both types of risers, a plurality of spaced vertical weir slots 64 are cut in the outer surface of the riser. The number of spaced weir slots 64 is a matter of choice, however, it has been found acceptable, for example, to include four spaced slots 64 per riser. The slots 64 form weir passageways for liquid to pass through the tray and the hollow interior of the riser forms a vapor passageway to pass through the tray.

Lower distributor tray 66 is positioned beneath upper distributor tray 56 and is spaced therefrom. It should also be noted that the lower distributor tray 66 is spaced above the catalyst bed 30 and the layer of inert balls 44 and, thus, forms part of the flow path from the inlet conduit 32 to the catalyst bed 30.

Before continuing with the description of the lower distributor tray 66, it should also be noted that the upper distributor tray 56 has a sleeved aperture 68 through which the sampling tube 34 fits in its passage to the catalyst bed. The same holds true for the lower distributor tray 66 wherein an aperture 70 is in position to be aligned with aperture 68 of the upper distributor tray 56 and an aperture 49 of the distributor trough to permit passage therethrough of the sampling tube 34.

The lower distributor tray 66 also contains a plurality of holes 72 in spaced relationship to one another to receive risers such as riser 62 shown in FIG. 3. All of the risers 60 or 62 are mounted in a conventional manner within the upper and lower distributor trays such as by welding the members in position so that a portion of each riser extends above the tray and another portion of each riser extends below the tray.

Figure 4:
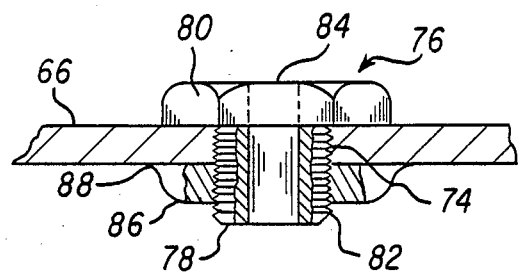
FIG. 4 is a fragmentary sectional view of a portion of the embodiment of FIG. 1 showing a downpipe mounted in position.

Additionally, a second set of holes (apertures) 74 is formed in lower distributor tray 66 for positioning therein a series of downpipes 76 to provide an additional liquid flow path through lower distributor tray 66. The type of downpipe 76 to be positioned in aperture 74 is shown in detail in FIG. 4 of the drawing. This type of downpipe 76 is formed with a reduced diameter body portion 78 and an enlarged head portion 80 on one end. The reduced diameter body portion 78 has a threaded outer surface 82. The downpipe 76 has a central bore 84 formed therein extending from the top of the enlarged head 80 to the bottom of the threaded body 78 to form a through passageway in the downpipe 76. The body of the downpipe 76 is extended through the aperture 74 in lower distributor tray 66 until the undersurface of the head 80 engages the upper surface of the lower distributor tray 66. The threaded body portion extends beyond the lower surface of lower distributor tray 66 and the downpipe 76 is retained in position by use of a threaded nut 86. To facilitate retention by the nut 86, a conventional type of tack filet weld 88 is shown to hold the nut 86 in closed position. Again the number of downpipes 76 and apertures 74 therefor in lower distributor plate is a matter of choice and, in connection with the depicted embodiment, it has been found acceptable to employ forty-four apertures 74 and appropriate downpipes 76. Additionally, in the depicted embodiment, there are forty-eight holes 72 through which risers 62 extend.

As shown more clearly in the enlarged view of FIG. 2, the uppermost ends of risers 62 and downpipes 76 of lower distribution tray 66 are positioned lower than the lower ends of the liquid and vapor passage means (the lower ends of risers 60 and 62) of upper distribution tray 56.

Risers 62 are provided with a side opening 90 located just above the upper surface of lower distributor tray 66 to provide a liquid passageway to the hollow interior of riser 62 and thus an initial passageway directly for the liquid to pass through lower distributor tray 66 to the catalyst bed 30 below. Accordingly, with the forty-four downpipes 76 and the forty-eight risers 62 with side openings 90, the result is there are ninety-two liquid passageways through lower distributor tray 66. This facilitates distribution of liquid onto the catalyst bed in the manner described below.

It should also be noted that drain holes are provided in the distributor trough, the upper distributor tray, and the lower distributor tray to facilitate the cleaning and emptying of the trays. Thus, a plurality of small drain holes (not shown) are in distributor trough 48, and holes 94 and 96 are in the upper distributor tray 56 and lower distributor tray 66 respectively for a similar purpose.

In operation, the distributor of the present invention is usable in a reactor of the type shown and described and utilized in a variety of known catalytic procedures. For example, acceptable processes are discussed and shown in U.S. Pat. No. 4,126,539.

Initially, reactor 22 is set up as shown. A catalytic bed 30 is fixed within the lower portion of hollow shell 24 in communication with drain tube 42 at the bottom and with thermowell 36 passing therethrough. A plurality of inert balls 44 is formed as a layer on the upper end of catalytic bed 30 to facilitate maintenance of the integrity of the bed. Above the inert balls 44 is a lower distributor tray 66, an upper distributor tray 56, and a distributor trough 48 in ascending order and spaced from one another. Extending upwardly from the central portion of distributor trough 48 is a deflector cone 46 which is surrounded by a splash plate 52 (the righthandside of which is obscured from view by sampling tube 34 in the illustration shown in FIG. 1). The deflector cone is positioned and aligned with the exit end of an inlet conduit 32.

Sampling tube 34 extends through the aligned vertical arrangement of distributor trays and trough through the inert balls 44 into the catalyst bed 30.

Liquid/vapor entering the reactor shell 24 through the inlet conduit at the top descends onto deflector cone 46 from which it is dispersed outward and downward and is directed by the deflector cone 46 and cooperating splash plate 52 onto distributor trough 48. The liquid then passes through the weir holes 50 on the surface of the distributor trough onto the upper distributor tray 56. At that point the dispersed liquid travels through the weirs 64 cut or otherwise formed in the surface of risers 60 and 62 onto lower distributor tray 66.

The multiplicity of passageways for the liquid on lower distributor tray 66 facilitates the uniform and rapid passage of the liquid therethrough onto the catalyst bed 30. This is achieved by the side openings 90 in the risers and the through bores 84 in the downpipe 76.

Vapor is permitted to pass through the lower and upper distributor trays by means of the central passageways in the risers.

The number of liquid introduction points is increased by the fitting of the downpipes 76 into the face of tray 66 which, because they carry only liquid, can be much smaller than risers 60 or 62. Also, a hole 90 may be bored in the side of the riser 60, 62 of upper tray 56 to facilitate symmetrical liquid distribution.

In one acceptable form, downpipes 76 are fabricated from bolts which have been axially bored to the correct diameter, and are held in position by retaining nuts 86 on the underside of tray 66. Because the bolts extend above the upper face of the tray, in the form of head 80, there is room on the tray to accumulate sediment which would foul the openings if holes were merely drilled into the tray. Furthermore, the mechanical nature of affixing down pipes 76 to tray 66 eliminates the tray warpage which would result from more conventional welding based fabrication techniques.

The total number of liquid distribution points represented by down pipe apertures 74 and riser holes 72 can vary but it is preferred that there be a minimum of four per square foot, nearly twice as many as presently in use in prior known systems. Because the liquid now flows through orifices rather than weirs, the design is much less sensitive to variations in tray levelness. FIG. 3 shows the side opening 90 as being a round orifice.

As discussed above, the overall objective is to maximize the number of discrete liquid streams entering the upper face of the catalyst bed 30 and to be consistent with a design incorporating ease of fabrication and mechanical integrity. Maximizing the liquid streams both helps ensure good distribution within the bed 30, and reduces the bed penetration required to attain equilibrium liquid distribution, resulting in good catalyst utilization in the upper bed.

The present system also ensures as nearly as possible that the liquid flow rate in each stream is the same, resulting in uniform liquid irrigation over the entire face of the bed 30. In order for this to occur throughout the range of liquid charge rates to the reactor, the nature of the fluid flow through the apertures in the distributor plate should be similar. Hence in the design of distributor 20, liquid flow is through openings 90 of risers 60 and 62 and through the liquid downpipes 76 in lower distributor plate 66. In both instances, flow is proportional to the square root of the liquid height on the distributor tray 66. If a mix of openings and slotted weirs (flow proportional to liquid height raised to 1.5 power) were used, it would be nearly impossible to have the same flow rate for each liquid stream of liquid feed to the reactor 22. The possibility of having the same flow rate occurs only at a single rate of liquid feed to the reactor.

Furthermore, the distributor system 20 of the present invention minimizes the effect of uneven tray installation/fabrication, that is if the distributor tray is out of level, there will be more liquid head on the low side of the tray. Since the flow rate through the apertures of the distributor 20 is proportional to the square root of liquid height, the effect of such distortions on liquid flow rate is minimized. By contrast, in a distributor employing weir flow, the effect of tray irregularities is magnified.

Thus, the several aforenoted objects and advantages are most effectively attained. Although several somewhat preferred embodiments have been disclosed and described in detail herein, it should be understood that this invention is in no sense limited thereby and its scope is to be determined by that of the appended claims.

We claim:

1. An inlet distributor for a fixed bed catalytic reactor of the type having a hollow shell with means defining an upper entry opening, means defining a lower drain opening, and a catalytic bed in the shell, the inlet distributor comprising:

an inlet deflector cone positioned in the shell beneath the entry opening, said cone defining a circumference, and a splash plate located near the circumference of the cone, whereby liquid introduced into the shell is deflected onto a liquid distributor trough positioned therebelow, said trough including means defining openings in said trough;

an upper distributor tray positioned beneath the distributor trough to receive liquid which passes through said openings in the distributor trough;

the upper distributor tray having vapor passage means for passing vapor through the tray and liquid passage means for passing liquid received from the distributor trough from above to below the upper distributor tray; and a lower distributor tray positioned beneath the upper distributor tray to receive liquid from said liquid passage means of the upper distributor tray;

the lower distributor tray having a series of risers and downpipes thereon, each of the series of lower tray risers and downpipes extend through, above and below the tray and each comprises a passageway for liquid to pass through the lower tray when received from the upper distributor tray, each of the lower tray risers comprising a vapor passageway, the lower tray downpipes having a smaller inside diameter than that of the lower tray risers;

the upper ends of the lower tray risers and the upper ends of the lower tray downpipes being lower than the lower ends of said vapor passage means and the lower ends of said liquid passage means of the upper distributor tray.

2. The invention in accordance with claim 1 wherein the downpipes and risers are arranged in a pattern on the lower distribution tray, wherein the pattern is such that the total number of liquid distribution points in the lower distributor tray represented by passageways through the downpipes and risers is at least four per square foot.

3. The invention in accordance with claim 1 wherein the vapor passage means in the upper distributor tray are hollow tubular members open at both ends and fixed in position in a receiving aperture in the upper distributor tray and extending above and below the tray so as to permit vapor to pass through the tray and have a plurality of weir slots formed in an outer surface of each vapor passage means through which liquid received from the distributor trough can pass from above to below the upper distributor tray.

4. The invention in accordance with claim 3 wherein the vapor passage means in the upper distributor tray are welded in position, weirs are cut into an outer surface of each vapor passage means, and risers in the lower distributor tray are welded in position.

5. The invention in accordance with claim 1 wherein the vapor passage means on the upper distributor tray comprises a series of risers mounted in spaced position on the upper distributor tray with each riser extending through an opening in the upper distributor tray and extending beyond an upper and a lower surface of the upper distributor tray, each of the risers being open above and below the upper distributor tray to permit vapor to pass therethrough.

6. The invention in accordance with claim 5 wherein each riser includes an upper periphery and the liquid passage means of the upper tray has at least one weir slot in the upper periphery of each riser.

7. The invention in accordance with claim 6 wherein the vapor passageways of the lower distributor tray have at least one weir slot in the upper periphery of each riser.

8. The invention in accordance with claim 7 wherein each of said downpipes has an axial bore therethrough to form the downpipe liquid passageways and each of said risers of the lower tray comprises a hollow tube open at its bottom and having a side opening above an upper surface of the lower distributor tray to form the riser liquid passageways the side opening being located below and separated from the weir slot of the vapor passageway.

9. The invention in accordance with claim 8 wherein each of said downpipes comprises a bolt having an enlarged head portion and a smaller diameter threaded body portion extending therefrom, the head and body portion of each bolt being axially bored to a desired diameter for the liquid passageway through the downpipe, each bolt passing through a receiving aperture formed in the lower distributor plate with an undersurface of the head portion of the bolt engaging the upper surface of the lower distributor tray, a retaining nut threadedly engaged with the body portion of each bolt and engaging an underside of the low distributor tray to mount each of the bolts in position with the axial passageway through the bolt forming the passage of liquid to the catalytic bed beneath the underside of the lower distributor tray.

10. The invention in accordance with claim 9 wherein each bolt head portion is sufficient to extend the bolt a predetermined distance above the upper surface of the lower distributor tray so as to space the opening to the axial passageway from the surface of the tray and avoid plugging thereof by accumulated sediment on the upper surface of the tray.

11. The invention in accordance with claim 10 wherein each of said downpipes is mechanically affixed to the lower distributor tray.

* * * * *